US006710561B2

(12) United States Patent
Dobson

(10) Patent No.: US 6,710,561 B2

(45) Date of Patent: Mar. 23, 2004

(54) CLOSURE SYSTEM

(75) Inventor: Simon Blair Dobson, Kent (GB)

(73) Assignee: Meritor Light Vehicle Systems-France (FR)

( * ) Notice: Subject to any disclaimer, the term of this patent is extended or adjusted under 35 U.S.C. 154(b) by 0 days.

(21) Appl. No.: 09/910,475

(22) Filed: Jul. 20, 2001

(65) Prior Publication Data

US 2002/0046502 A1 Apr. 25, 2002

(30) Foreign Application Priority Data

Jul. 21, 2000 (GB) ............................................ 0017823

(51) Int. Cl.[7] ............................... H02P 5/00; H02P 7/00

(52) U.S. Cl. ....................... 318/286; 318/254; 318/280; 318/283; 318/264; 318/461; 318/466; 318/445

(58) Field of Search ................................. 318/268, 254

(56) References Cited

U.S. PATENT DOCUMENTS 4,468,596 A * 8/1984 Kinzl et al. ................. 318/287
5,044,222 A 9/1991 Tanaka et al.
5,801,501 A * 9/1998 Redelberger ................ 318/283
5,832,664 A * 11/1998 Tajima et al. .................. 49/26
5,872,436 A * 2/1999 Bergmann et al. .......... 318/286
5,932,931 A * 8/1999 Tanaka et al. ............. 301/10.1
6,032,415 A * 3/2000 Tajima .......................... 49/28
6,086,177 A * 7/2000 Driendl et al. .............. 318/466
6,100,658 A * 8/2000 Kume et al. ................ 318/286
6,125,583 A * 10/2000 Murray et al. ................ 49/291
6,304,048 B1 * 10/2001 Davies et al. ............... 318/475
6,437,528 B1 * 8/2002 Wagner et al. .............. 318/282

FOREIGN PATENT DOCUMENTS

DE 40 19 787 A1 1/1991
DE 4020351 A 1/1992
DE 40 20 351 A 1/1992
EP 0 903 459 A1 3/1999
JP 09-328964 * 12/1997

OTHER PUBLICATIONS

Search Report Under Section 17 Dated Apr. 23, 2001.
European Search Report dated Nov. 16, 2001.

* cited by examiner

*Primary Examiner*—Robert Nappi
*Assistant Examiner*—Tyrone Smith
(74) *Attorney, Agent, or Firm*—Carlson, Gaskey & Olds

(57) ABSTRACT

A closure system including a closure moveable for substantially closing an aperture in use, and an actuator for at least closing the closure, the actuator being mounted by mounting means, the mounting means including one or more measurement cells for measuring, in use, parameters of the closure systems, in use the system being subjected to movement and being arranged such that it is possible to at least partially distinguish trap forces applied to the closure from acceleration forces applied to the closure as a result of the movement of the closure system by consideration of the measured parameters.

24 Claims, 1 Drawing Sheet

CLOSURE SYSTEM

BACKGROUND OF THE INVENTION

The present invention relates to a closure system and in particular to closure systems associated with vehicles such as land vehicles, aircraft and marine vehicles. One specific use of the invention would be in automobiles.

Automobiles are known whereby doors of such automobiles include windows which can be power opened and power closed. When a window is being power closed, it is possible for parts of people or children to be get trapped in between the window and window surround. In order for such windows to function within legal and other requirements, it is necessary to avoid applying more than a certain, predetermined maximum force to an arm, finger or other part of the body when that part of the body interferes with the normal closure of the window. Equally, it is necessary to ensure that a sufficient force is available to fully close the window into its seals. To this end, the relevant specifications allow for the limited force to be exceeding once the opening is smaller than would admit entry of any part of the body. Thus in known contact type anti-trap (anti-squeeze) systems a switch, typically within the door seal, is closed when a body part is trapped, and this triggers a decision within a control unit to stop or reverse the closing motion, and thereby release the body part.

Other known contact type anti-squeeze systems rely on an inference trap force from a parameter measurable at the motor such as change in motor speeds, change in motor current or change in output torque, all of which are related to the forces applied to the closure ie the output force of the actuator assembly.

However, due to rough roads or other terrain over which the vehicle may be travelling, primarily vertical accelerations are imposed on the vehicle. These vertical accelerations are applied to the window glass as to any other part of the vehicle and are reacted through the window regulator as variations in closure force. Under some circumstances these variations may produce forces on the window glass which resemble the forces produced when body parts are trapped. Under such circumstances the control unit will incorrectly reopen the window then this is unnecessary. Alternatively when a body part is being trapped, accelerations on the window glass due to rough terrain may reduce the apparent trapping force to below the predetermined level where upon closure will continue and further trap a body part.

Thus situations arise which are inconvenient and/or distracting and are potentially dangerous for the occupants of the vehicle.

SUMMARY OF THE INVENTION

An object of the present invention is to provide an improved form of closure system.

Thus according to the present invention there is provided a closure system including a closure moveable for substantially closing an aperture in use, and an actuator for at least closing the closure, the actuator being mounted by mounting means, the mounting means including one or more measurements cells for measuring, in use, parameters of the closure system, in use the closure system being subjected to accelerations and being arranged such that it is possible to at least partially distinguish forces applied to the closure by the actuator from acceleration forces applied to the closure as a result of the accelerations of the closure system by consideration of the measured parameters.

Advantageously this provides for a system wherein mounting means of an actuator are able to fulfil a triple function, namely mounting of the actuator and also measurement of forces applied to the closure by the actuator and also measurement of forces applied to the closure as a result of the accelerations of the closure system.

Furthermore the applicant is the first to realize that the closure and the actuator are subjected to substantially the same accelerations and thus the actuator can be used for determining the acceleration forces on the closure. Once the acceleration forces on the closure have been determined then it is possible to subtract these from output force of the actuator to more accurately determine true trap forces.

According to a further aspect of the present invention there is provided an aperture motor assembly for at least closing an aperture, the motor assembly including measurement cells being arranged such that in use it is possible to at least partially distinguish forces applied to the associated aperture closure by the actuator from accelerations forces applied to the associated aperture closure as a result of accelerations of the aperture closure and motor assembly by consideration of the output from the measurement cells.

BRIEF DESCRIPTION OF THE DRAWINGS

The invention will now be described by way of example only, with reference the accompanying drawings in which.

DETAILED DESCRIPTION OF THE PREFERRED EMBODIMENT

Figure 1:
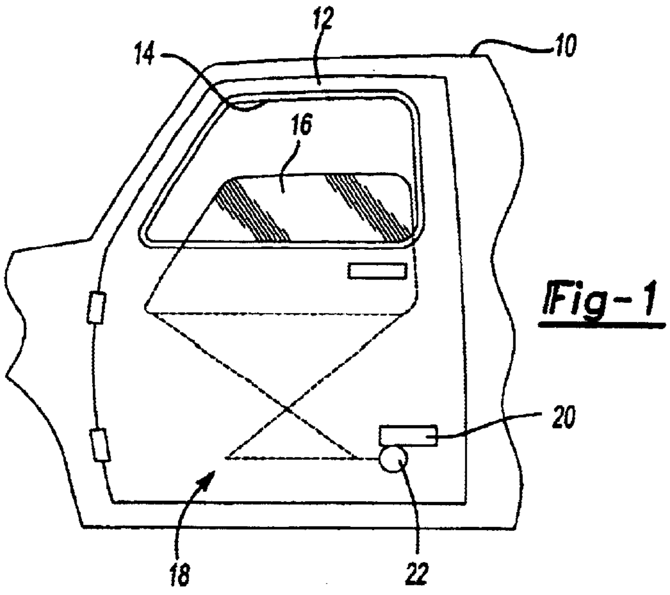
FIG. 1 is a side view of a vehicle including closure system according to the present invention.

With reference to FIG. 1 there is shown a vehicle 10 having a door 12 with a window aperture 14. An aperture closure in the form of a window glass 16 is moveable vertically to open and close the window aperture 14. A window regulator shown generally as 18 includes a window motor 20 and a gearbox 22.

The motor 20 and gearbox 22 are mounted via mounting means, in this case in the form of first mount 24 and second mount 26. First and second mounts 24 and 26 include load cells in this case shear load cells C1 and C2 each forming the load reaction path between the motor and the vehicle door, and between them constrain the motor within the door.

The shear load cells C1 and C2 are positioned at distance 2R from each other and the geometrical position of the center-of-gravity CG of the motor/gearbox is also known.

Figure 2:
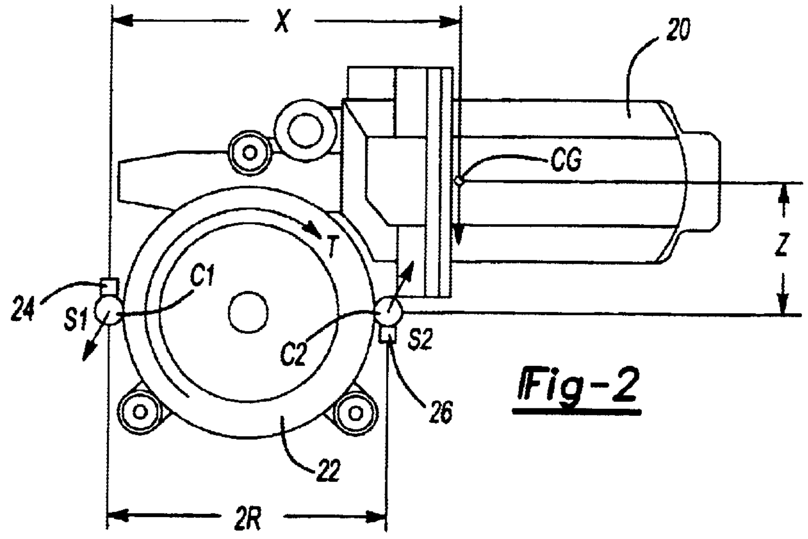
FIG. 2 is a cross section view of the window motor and gearbox of FIG. 1

Consideration of FIG. 2 shows that the shear load cells C1 and C2 have output levels S1 and S2.

An output torque T from the motor 20 acts clockwise around the motor output shaft when the window is being closed and, with the vehicle 10 stationary, is a function of a output force f.

The weight of the gearbox and window motor acts through the center-of-gravity CG. With the vehicle 10 stationary the force M at CG is equivalent to the combined weight of the motor 20 and gearbox 22. However, with the vehicle moving over rough terrain the force M will vary. It should be noted that CG is located horizontally by distance x from shear load cell C1 and vertically from shear load cell C1 by distance z.

Figure 3:
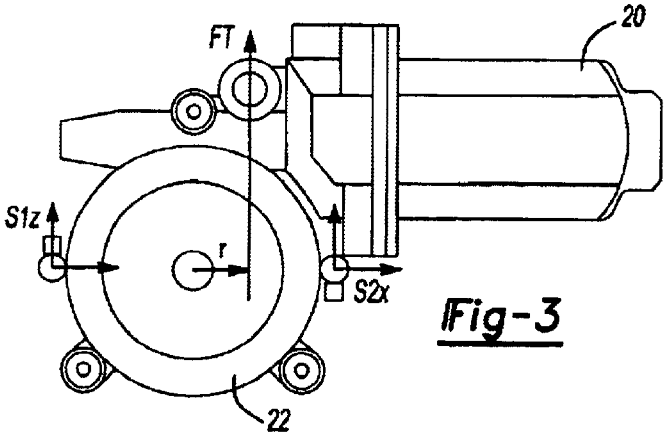
FIG. 3 is a further view of FIG. 2.

Consideration of FIG. 3 shows that the forces S1 and S2 can be resolved in the x and y directions and become S1x, S1z, S2x and S2z. The output torque T of the motor can be considered to be a tangential force Ft acting at a radius r equivalent to the pitch circle diameter of a drum or pinion and, for convenience, this has been shown to be parallel to the z axis.

Note that the analysis below is more complicated where the sensors and output shaft are not in line, and/or the forces act at some other angle, but it may demonstrated that the same principles apply.

Consideration of the above shows that several equations can be written, which express the situation at steady state ie with the vehicle 10 stationary and the window closing at a constant speed.

Given that we do not know the directions of S1 and S2 merely their magnitudes then, by pythagoras:

$$S1x^2+S1z^2=S1^2 \text{ and } S2x^2+S2z^2=S2^2$$

Since we have conveniently defined Ft parallel to z axis and M acting vertically downwards, also parallel to the z axis then, $$Ftx=0 \text{ and } Ftz=Ft, \text{ and furthermore}$$

$$Fmx=0 \text{ and } Fmz=M$$

Resolving in x and z we have the summations:

$$\int x=0,\ \int z=0, \text{ thus}$$

$$S1x+S2x=0,\ S1z+S2z=Ft-M$$

And taking moments about S1

$$S2z\cdot 2R+FT(R+r)=M\cdot x$$

Collecting Terms $$S2z=Ft(R+r)/2\cdot R-M\cdot x/2\cdot R$$

of which R, r & x are all known and constant for a given application.

$$S2z=Ft\cdot k1-M\cdot k2$$

Where the constants k1=(R+r)/2·R & k2=x/2·R; thus $$S1z=Ft-M-S2z$$

$$S1z=Ft-M-Ft(R+r)/2\cdot R-M\cdot x/2\cdot R$$

Collecting Terms $$S1x=Ft-Ft(R+r)/2\cdot R-M-M\cdot x/2\cdot r$$

$$S1z=Ft(1(R+r)/2\cdot R)-M(M1-x/2\cdot R)$$

$$\text{But } k1=(R+r)/2\cdot r \ \& \ K2=x/2\cdot R, \text{ so}$$

$$S1z=Ft(1-k1)-M(1-k2)$$

following which
Thus S2=Ft·k1−M·k2, and $$S1=Ft(1-k1)-M(1-k2)$$

S1 and S2 from the output from the shear load cell C1 and C2, k1 and k2 being constant, we now have two equations and two unknowns (Ft and M) and therefore can solve for Ft and M.

This solution allows comparison of the motor/gearbox effective weight M and the known pre-measured value of the motor/gearbox weight. This comparison gives an instantaneous value for the vertical g-forces applied to the window motor and therefore the adjacent window glass and permits greater discrimination of the system loads resulting from the vehicle movement from those associated with a trapped object or body part.

Thus the above system, by comparing the output S1 and S2 from the shear load cell C1 and C2, the proportion of the measured output due to vertical acceleration and that due to an object trapped may be distinguished arithmetically and thus a better definition of actual trap force (as opposed to apparent trap force) maybe obtained. As such it is possible to largely eliminate interference with the true trap force signal caused by vibration and/or accelerations with a large vertical component. The present invention achieves this in a particular cost effective manner as a minimum of components are required since the shear load cells C1 and C2 provide both the function of mounting the motor and also of measuring the parameters which can be used to determine true trap force from apparent trap force.

As a result of improved sensitivity of the system to objects being trapped, lower force thresholds may be specified and therefore more rapid reaction may be obtained both of which leads to a reduction in the overall trap force experienced by the person or object.

The system also reduces the likelihood of false trap signals and hence false reopening of the window, thus reducing the possibility of distraction and annoyance to occupants of the vehicle.

Once the window is virtually closed such that any gap between the window glass and window aperture is sufficiently small to not allow entry of a small body part such as a finger, then the anti-squeeze requirement is no longer necessary. Thus when the window glass reaches such a position this position can be indicated by a proximity sensor, micro switch or the like which would indicate to control means of the window that anti-squeeze is no longer required for the final closing of the window.

It is envisaged that the present invention could be used in a variety of applications, such as automotive windows and other partitions moving in a primarily vertical direction. However, the principles outlined above would be applicable to other types of closure where the motor may be so mounted as to be subject to the disturbing forces in the same manner as the closure being operated by that motor. Further applications include vehicular sun roofs, transverse and longitudinal sliding doors as typically used for corridor and compartment closures in trains and aircrafts, and other types of sliding partition on ships and other marine vehicles.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A closure system comprising:

a closure moveable in an aperture;

an actuator for moving the closure; and a mounting system that mounts the actuator and having at least one measurement cell for measuring at least one parameter of the closure system, wherein said at least one measurement cell generates at least one output based on said at least one parameter and wherein said at least one output distinguishes an actuator force applied to the closure by the actuator and an acceleration force applied to the closure by an external acceleration as two separate values.

2. The closure system as defined in claim 1 in which the closure system is part of a vehicle.

3. The closure system as defined in claim 2 in which the vehicle is one of a land vehicle, an aircraft, and a marine vehicle.

4. The closure system as defined in claim 1 in which the closure moves primarily in a vertical direction.

5. The closure system as defined in claim 1 in which the closure moves primarily in a horizontal direction.

6. The closure systems as defined in claim 1 in which the closure is a window.

7. The closure system as defined in claim 6 in which the window is a door window.

8. The closure systems as defined in claim 7 in which the closure system is mounted in a door.

9. The closure systems as defined in claim 1 in which the closure is a sun roof.

10. The closure system as defined in claim 1 in which the closure is a partition.

11. The closure system as defined in claim 1 in which the closure is a sliding personnel door.

12. The closure system as defined in claim 1 in which the actuator includes an electric motor.

13. The closure system as defined in claim 12 in which the actuator includes a gearbox.

14. The closure system as defined in claim 13 in which the actuator is a window regulator motor including a gearbox.

15. The closure system as defined in claim 1 in which the mounting system includes two measurement cells in a spaced apart relationship.

16. The closure system as defined in claim 1 in which said at least one parameter is force.

17. The closure system as defined in claim 1 in which the actuator opens the closure.

18. An aperture motor assembly for closing an aperture comprising:

a closure; and a first measurement cell that generates a first output and a second measurement cell that generates a second output, wherein comparison of the first output and the second output distinguishes an actuator force applied to the closure by the actuator and an acceleration force applied to the closure by an external acceleration as two separate values.

19. The aperture motor assembly as defined in claim 18 suitable for use as a window regulator motor assembly.

20. The aperture assembly as defined in claim 19 in which the motor assembly includes a gearbox.

21. The closure system as defined in claim 1 wherein the system measures at least two parameters.

22. The closure system as defined in claim 21 wherein one of said parameters is the actuator force applied to the closure by the actuator.

23. The closure system as defined in claim 21 wherein one of said parameters is a movement force applied to the actuator due to movement of the closure system.

24. A closure system comprising:

a closure moveable in an aperture and subjectable to an acceleration force resulting from external acceleration and an actuator force; and the actuator that applies the actuator force on the closure to move to the closure;

a mounting system that mounts the actuator, the mounting system having a first measurement cell that generates a first output and a second measurement cell that generates a second output, wherein comparison of the first output and the second output distinguishes an actuator force applied to the closure by the actuator and an acceleration force applied to the closure by an external acceleration as two separate values.

* * * * *